(12) United States Patent
Inoue et al.

(10) Patent No.: US 10,708,561 B2
(45) Date of Patent: Jul. 7, 2020

(54) POS TERMINAL, INFORMATION PROCESSING DEVICE, WHITE BALANCE ADJUSTMENT METHOD, AND RECORDING MEDIUM

(71) Applicant: NEC Corporation, Tokyo (JP)

(72) Inventors: Takanori Inoue, Tokyo (JP); Hideo Yokoi, Tokyo (JP); Jun Kobayashi, Tokyo (JP); Eiji Muramatsu, Tokyo (JP); Hiroshi Yamada, Tokyo (JP); Kota Iwamoto, Tokyo (JP); Tetsuo Inoshita, Tokyo (JP); Soma Shiraishi, Tokyo (JP)

(73) Assignee: NEC Corporation, Tokyo (JP)

( * ) Notice: Subject to any disclaimer, the term of this patent is extended or adjusted under 35 U.S.C. 154(b) by 194 days.

(21) Appl. No.: 15/129,354

(22) PCT Filed: Mar. 18, 2015

(86) PCT No.: PCT/JP2015/001522
§ 371 (c)(1),
(2) Date: Sep. 26, 2016

(87) PCT Pub. No.: WO2015/146084
PCT Pub. Date: Oct. 1, 2015

(65) Prior Publication Data
US 2017/0180693 A1    Jun. 22, 2017

(30) Foreign Application Priority Data

Mar. 27, 2014    (JP) ................................. 2014-065933

(51) Int. Cl.
*H04N 9/73*    (2006.01)
*G06T 7/90*    (2017.01)
(Continued)

(52) U.S. Cl.
CPC .............. *H04N 9/735* (2013.01); *G06K 7/146* (2013.01); *G06K 9/6202* (2013.01);
(Continued)

(58) Field of Classification Search
CPC ............ H04N 9/735; G06T 7/90; G06T 7/146
(Continued)

(56) References Cited

U.S. PATENT DOCUMENTS 6,542,185 B1 * 4/2003 Bogardus ............... H04N 9/735
348/188
9,807,322 B2 * 10/2017 Feder .................. H04N 5/35554
(Continued)

FOREIGN PATENT DOCUMENTS

CN          1581917 A        2/2005
CN          202059518        11/2011
(Continued)

OTHER PUBLICATIONS

Notification of Reasons for Refusal issued by Japanese Patent Office dated Jun. 13, 2017, in counterpart Japanese Patent Application No. 2016-509999.
(Continued)

*Primary Examiner* — Jeremiah C Hallenbeck-Huber
(74) *Attorney, Agent, or Firm* — Finnegan, Henderson, Farabow, Garrett & Dunner, L.L.P.

(57) ABSTRACT

To provide a POS terminal or the like which enables adjustment of white balance of an object to be sufficiently accurate even in the change of external light illuminating the object. The POS terminal includes: an image capture unit which captures an object including a plurality of respectively different reference colors and generates an image; a comparison unit which compares a portion of the image relating to each of the reference colors with a standard image which is a standard of the reference colors; and an adjust-
(Continued)

ment unit which adjusts white balance based on a result of the comparison.

15 Claims, 9 Drawing Sheets

(51) Int. Cl.
*G07G 1/00* (2006.01)
*G06K 7/14* (2006.01)
*G06K 9/62* (2006.01)
*G06Q 20/20* (2012.01)

(52) U.S. Cl.
CPC ............. *G06Q 20/208* (2013.01); *G06T 7/90* (2017.01); *G07G 1/0009* (2013.01); *G06T 2207/10024* (2013.01)

(58) Field of Classification Search
USPC ........................................................ 348/150
See application file for complete search history.

(56) References Cited

U.S. PATENT DOCUMENTS

| | | | | |
|---|---|---|---|---|
| 2010/0245617 A1* | 9/2010 | Shuster | .................. | H04N 9/735 348/223.1 |
| 2013/0242361 A1* | 9/2013 | Matsumoto | .......... | H04N 1/6044 358/504 |
| 2014/0052555 A1* | 2/2014 | MacIntosh | ........... | G06Q 20/208 705/23 |
| 2015/0055085 A1* | 2/2015 | Fonte | ...................... | G06F 17/50 351/178 |
| 2015/0086119 A1* | 3/2015 | Sato | ................... | G06K 9/00228 382/195 |
| 2015/0109451 A1* | 4/2015 | Dhankhar | .............. | G01G 19/40 348/150 |
| 2015/0172513 A1* | 6/2015 | Noorkami | ............ | H04N 1/6077 348/223.1 |
| 2015/0326842 A1* | 11/2015 | Huai | ....................... | G06T 5/007 348/223.1 |
| 2016/0182874 A1* | 6/2016 | Richards | ................ | H04N 9/735 348/187 |
| 2016/0236874 A1* | 8/2016 | Olofsson | ................ | B65G 47/31 |

FOREIGN PATENT DOCUMENTS

| | | | |
|---|---|---|---|
| JP | 7-8864 | | 2/1995 |
| JP | 8-182002 | | 7/1996 |
| JP | 1996-182002 | * | 7/1996 |
| JP | 2006-24566 | | 10/2008 |
| JP | 2010-211308 | | 9/2010 |
| JP | 5149527 | | 2/2013 |

OTHER PUBLICATIONS

Notification of Office Action issued by The State Intellectual Property Office of the People's Republic of China dated Jan. 19, 2018, in counterpart Chinese Patent Application No. 201580016431. X.

International Search Report and Written Opinion dated May 19, 2015, in corresponding PCT International Application.

* cited by examiner

POS TERMINAL, INFORMATION PROCESSING DEVICE, WHITE BALANCE ADJUSTMENT METHOD, AND RECORDING MEDIUM

CROSS-REFERENCE TO RELATED PATENT APPLICATIONS

This application is a National Stage Entry of International Application No. PCT/JP2015/001522, filed Mar. 18, 2015, which claims priority from Japanese Patent Application No. 2014-065933, filed Mar. 27, 2014. The entire contents of the above-referenced applications are expressly incorporated herein by reference.

TECHNICAL FIELD

The present invention relates to a Point of Sales (POS) terminal device or the like which is used for the settlement of a product.

BACKGROUND ART

PTL 1 discloses a technique in which an image of a product carried on a belt conveyor within a casing for blocking external light is captured by a color image capture camera at a predetermined time interval while the product is being illuminated by an illumination device and white balance is adjusted based on the captured image. Adjusting white balance refers to a function of color correction to make a white object look white and corrects a color difference in a white material caused by different light sources (e.g., sunlight and an electric lamp).

CITATION LIST

Patent Literature

[PTL 1] Japanese Unexamined Patent Application Publication No. H08-182002

SUMMARY OF INVENTION

Technical Problem

In PTL 1, however, essentially only an illumination device disposed inside a casing illuminates an object, merely in some consideration of the entry of external light which cannot be prevented at the entrance of the casing. In other words, PTL 1 does not consider illumination of an object directly from external light or adjusting white balance of an object when the external light is changed.

The present invention has been made in order to solve the problem. A main object of the present invention is to provide a POS terminal or the like which enables adjustment of white balance of an object to be sufficiently accurate even in the change of external light illuminating the object.

Solution to Problem

In view of the above-mentioned problems, first aspect of the present invention is a POS terminal. The POS terminal includes:

an image capture means which captures an object including a plurality of respectively different reference colors and generates an image;

a comparison means which compares a portion of the image relating to each of the reference colors with a standard image which is a standard of the reference colors; and an adjustment means which adjusts white balance based on a result of the comparison.

Second aspect of the present invention is an information processing device. The device includes:

an acquisition means which acquires an image generated by capturing an object including a plurality of respectively different reference colors;

a comparison means which compares a portion of the image relating to each of the reference colors with a standard image which is a standard of the reference colors; and an adjustment means which adjusts white balance based on a result of the comparison.

Third aspect of the present invention is an information processing system. The system includes:

a POS terminal including an image capture means which captures an object including a plurality of respectively different reference colors and generates an image; and an information processing device including,
an acquisition means which acquires an image generated by capturing an object including a plurality of respectively different reference colors,
a comparison means which compares a portion of the image relating to each of the reference colors with a standard image which is a standard of the reference colors, and
an adjustment means which adjusts white balance based on a result of the comparison.

Fourth aspect of the present invention is a white balance adjustment method. The method includes:

capturing an object including a plurality of respectively different reference colors and generating an image;

comparing a portion of the image relating to each of the reference colors with a standard image which is a standard of the reference colors; and adjusting white balance based on a result of the comparison.

Fifth aspect of the present invention is a storage medium storing a program which causes a computer to execute function of:

capturing an object including a plurality of respectively different reference colors and generate an image;

comparing a portion of the image relating to each of the reference colors with a standard image which is a standard of the reference colors; and adjusting white balance based on a result of the comparison.

Advantageous Effects of Invention

The present invention enables to provide a POS terminal or the like which enables adjustment of white balance of an object to be sufficiently accurate even in the change of external light illuminating the object.

DESCRIPTION OF EMBODIMENTS (Outline of Exemplary Embodiments of the Present Invention)

Figure 1:
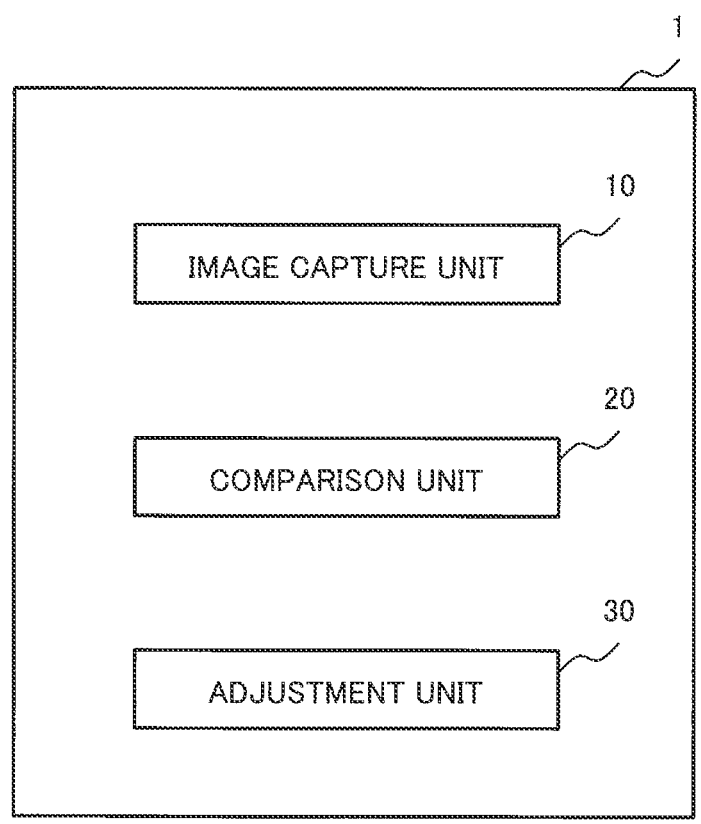
FIG. 1 is a view illustrating an example of the outline of a POS terminal according to a first exemplary embodiment of the present invention.

The outline of each of exemplary embodiments according to the present invention is described. FIG. 1 is a view illustrating the outline of a POS terminal 1 according to each of the exemplary embodiments of the present invention. As illustrated in FIG. 1, the POS terminal 1 includes an image capture unit 10, a comparison unit 20, and an adjustment unit 30.

The image capture unit 10 captures an object including a plurality of respectively different reference colors and generates an image. The comparison unit 20 compares a portion of the image captured by the image capture unit 10 and relating to each of the reference colors with an image which is a standard of the reference colors. The adjustment unit 30 adjusts white balance based on a result of the comparison by the comparison unit 20.

The POS terminal 1 according to each of the exemplary embodiments of the present invention adjusts white balance using a plurality of respectively different colors, and thus, enables to improve the accuracy of adjustment of white balance.

In the above, a description has been given of the case where the POS terminal 1 includes the image capture unit 10, the comparison unit 20, and the adjustment unit 30. The exemplary embodiments of the present invention are not limited to only this case. For example, the POS terminal 1 may include the image capture unit 10, an information processing device (not illustrated) such as a server may include the comparison unit 20 and the adjustment unit 30, and the POS terminal 1 may be connected to the information processing device by a wired or wireless communication. The information processing device acquires an image captured and generated by the image capture unit 10 of the POS terminal 1 via the wired communication or the wireless communication, and performs comparison and white balance adjustment of the image.

First Exemplary Embodiment

Figure 2:
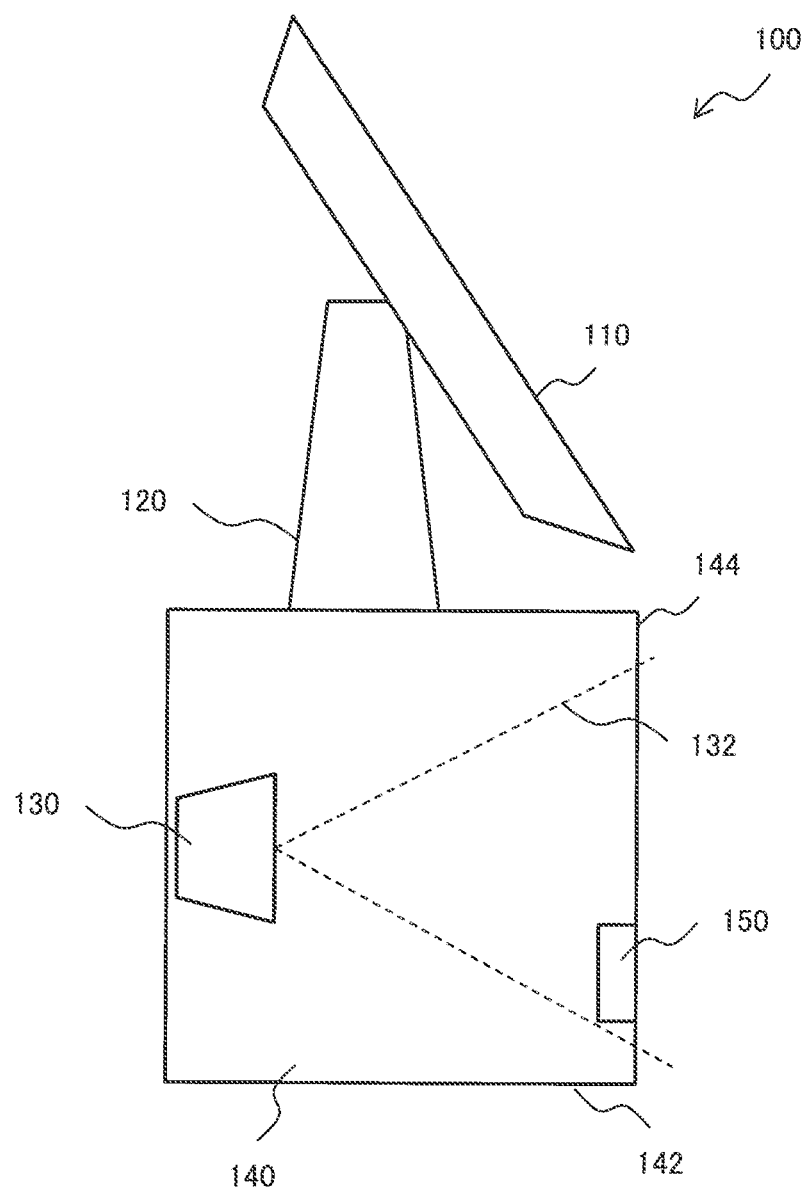
FIG. 2 is a side view illustrating an example of the appearance of the POS terminal according to the first exemplary embodiment.
Figure 3:
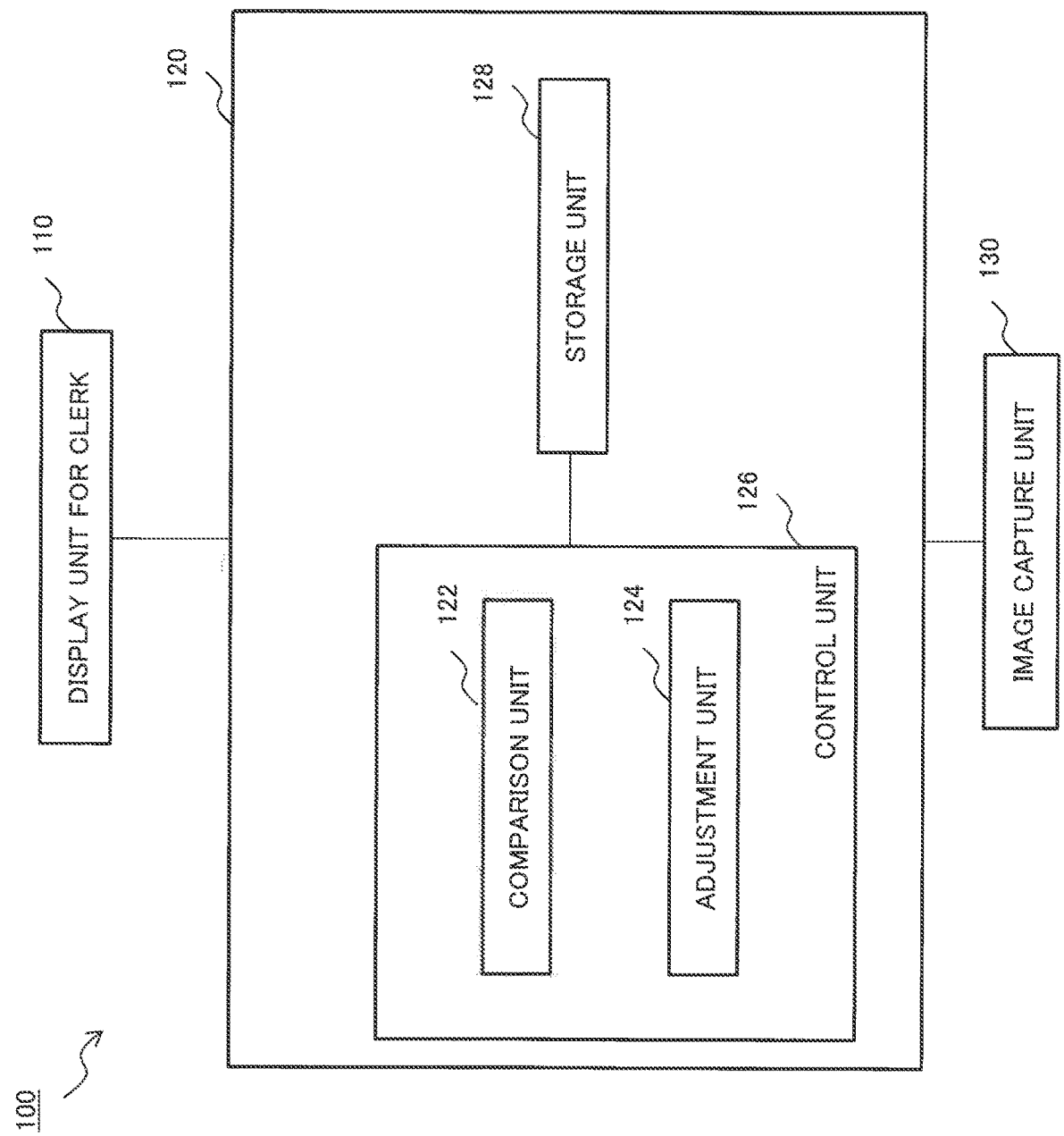
FIG. 3 is a view illustrating an example of the hardware configuration of the POS terminal according to the first exemplary embodiment.

FIG. 2 is a side view illustrating the appearance of a POS terminal 100 according to a first exemplary embodiment. In addition, FIG. 3 is a view illustrating the hardware configuration of the POS terminal according to the first exemplary embodiment. The POS terminal 100 includes a display unit for a clerk 110, an information processing unit 120, a product reading device 140, and a color pattern 150 including a plurality of respectively different colors. A clerk is in the front side of the display unit for a clerk 110 in FIG. 2.

The display unit for a clerk 110 is a touch panel, a liquid crystal display (LCD) or the like. The display unit for a clerk 110 may include an input device such as a keyboard. The display unit for a clerk 110 displays information necessary for a clerk under the control of the information processing unit 120, and accepts the operation of the clerk.

The information processing unit 120 is, for example, a computer. The information processing unit 120 includes a control unit 126, such as a central processing unit (CPU), including a comparison unit 122 and an adjustment unit 124, and a storage unit 128, such as a memory or a hard disk. The information processing unit 120 controls the operations of the display unit for a clerk 110 and the product reading device 140. In addition, the information processing unit 120 performs necessary processing in accordance with the operation accepted by the display unit for a clerk 110. In addition, the information processing unit 120 performs necessary processing, such as image processing, in accordance with image information read by the product reading device 140. The information processing unit 120 will be described later in detail.

The product reading device 140 includes a casing 142, a light-transmissive product reading face 144, and an image capture unit 130. The product reading face 144 is provided on a clerk-side face of the casing 142, toward which an article is directed in image capturing of the article. An article to be captured is mainly a product. The image capture unit 130 is mounted inside the casing 142, and the image capture unit 130 is disposed on the opposite side of the product reading face 144. When a clerk directs an article received from a customer toward the product reading face 144, the image capture unit 130 captures the article and thereby reads an image. Thereby, the POS terminal 100 executes processing of recognizing the article. It should be noted that the article is illuminated by external light, such as an electric lamp disposed on the ceiling of a shop, or sunlight radiating from a window.

The image capture unit 130 reads an image of an article, and creates a range image based on the read image. The image capture unit 130 has an image capturable range 132, the image capturable range 132 being defined between the two dashed lines illustrated in FIG. 2. Since the image capturable range 132 includes the color pattern 150, the image capture unit 130 is capable of capturing the color pattern 150. The color pattern 150 includes, for example, red, green, and blue, as a plurality of respectively different reference colors. The image capture unit 130 is described below in detail.

To create a range image, the image capture unit 130 can employ at least three methods described below, that is, a first method, a second method, and a third method.

In the first method, the image capture unit 130 includes a two-dimensional image capture section (not illustrated) which captures an article being a product and thereby reads a two-dimensional image, a range sensor (not illustrated) which measures a distance between the product reading face 144 and the article, and a range image generation section (not illustrated). The two-dimensional image capture section captures an article directed toward the product reading face 144, and generates a two-dimensional color image or a two-dimensional monochrome image including the image of the article.

The range sensor measures a distance between the range sensor and the position of the article directed toward the product reading face 144 using, for example, a time-of-flight (TOF) method. In other words, the range sensor irradiates a light beam such as infrared light, and measures a distance based on a time required for the irradiated light beam to make a round trip between the product reading face 144 and the article. The range image generation section measures distances for a plurality of positions on the surface of the article in the same way, superimposes two-dimensional images one on top of the other, and generates a range image (three-dimensional image). In the first method, the image capture unit 130 is capable of capturing an image of an article when a distance from the article to the product reading face 144 is within a predetermined range (e.g., 15 cm to 30 cm).

In the second method, the image capture unit 130 includes a single two-dimensional image capture section which reads a two-dimensional image. In the second method, an image of an article is acquired by taking a difference between a background image preliminarily captured by the image capture unit 130 and an image including the article.

In the third method, the image capture unit 130 includes a plurality of two-dimensional image capture sections each of which reads a two-dimensional image (hereinafter, also referred to as a "captured image"), and a range image generation section. The range image generation section generates a range image (three-dimensional image) based on the difference in a field of view among the plurality of image capture sections.

The control unit 126 extracts a feature value of color information on the color pattern 150 from an image captured by the image capture unit 130.

The comparison unit 122 compares the feature value of each of the reference colors in the image captured by the image capture unit 130 with a feature value of a standard image (hereinafter, referred to as a "standard image feature value") which is stored in the storage unit 128 and is a standard of the reference colors. The standard image feature value is preliminarily stored in the storage unit 128. Alternatively, the standard image feature value for the reference colors may be extracted from an image captured and acquired by the image capture unit 130 under a predetermined condition for the purpose of image recognition for the POS terminal 100. The predetermined condition herein refers to an image capture environment, such as an appropriate illumination.

The standard image feature value for the reference colors represents hue, saturation, lightness or the like by, for example, a numerical value. The storage unit 128 stores the standard image feature value for the plurality of respectively different reference colors. A description is given specifically of the case where hue is used as the standard image feature value for the reference colors.

The reference colors include red (hereinafter, indicated as R), green (hereinafter, indicated as G), and blue (hereinafter, indicated as B). The standard image feature value for the reference colors herein is a value which is normally called as the name "pixel value." In this case, for example, the standard image feature value (pixel value) for red which is a reference color stored in the storage unit 128 can be represented as (R1, G1, B1)=(100, 0, 0). Likewise, the standard image feature value for green can be represented as (R2, G2, B2)=(0, 100, 0). Likewise, the standard image feature value for blue can be represented as (R3, G3, B3)=(0, 0, 100).

An example of the case where the image capture unit 130 captures an image of red, green, and blue of the color pattern 150 is described below. In this example, it is assumed that a feature value of a red portion of a captured image is (R4, G4, B4)=(100, 0, 0), a feature value of a green portion is (R5, G5, B5)=(0, 100, 0), and a feature value of a blue portion is (R6, G6, B6)=(0, 0, 90).

The comparison unit 122 compares the standard image feature value (R1, G1, B1) for red with the feature value (R4, G4, B4) of the red portion of the captured image. In other words, the comparison unit 122 compares R1 with R4, G1 with G4, and B1 with B4. In the same way, the comparison unit 122 compares (R2, G2, B2) with (R5, G5, B5), and (R3, G3, B3) with (R6, G6, B6).

According to the result of the comparison by the comparison unit 122 in the present example, only between B3=100 and B6=90, there is the difference that B6 is smaller by 10 than B3 (the standard image feature value for blue), whereas there is no difference between the rest of the values.

The adjustment unit 124 adjusts white balance based on the result of the comparison by the comparison unit 122. As described above, there is no difference for red and green from the standard image feature value (pixel value) for the reference colors stored in the storage unit 128, and thus color adjustment is not performed. For blue, however, the feature value (pixel value) B6 of the captured image is 90, whereas the standard image feature value (pixel value) B3 for the reference colors stored in the storage unit 128 is 100. Hence, since there is a difference of 10 between both the values, white balance is adjusted by adding 10 for blue.

In the present exemplary embodiment, the case where adjustment is performed for blue has been described. However, in the case where there is a difference in the feature values (pixel values) for red or green, white balance may be adjusted for red or green.

The comparison unit 122 and the adjustment unit 124 can be implemented by executing a program under the control of, for example, the control unit 126. Specifically, the comparison unit 122 and the adjustment unit 124 are implemented by executing a program stored in the storage unit 128.

Figure 4:
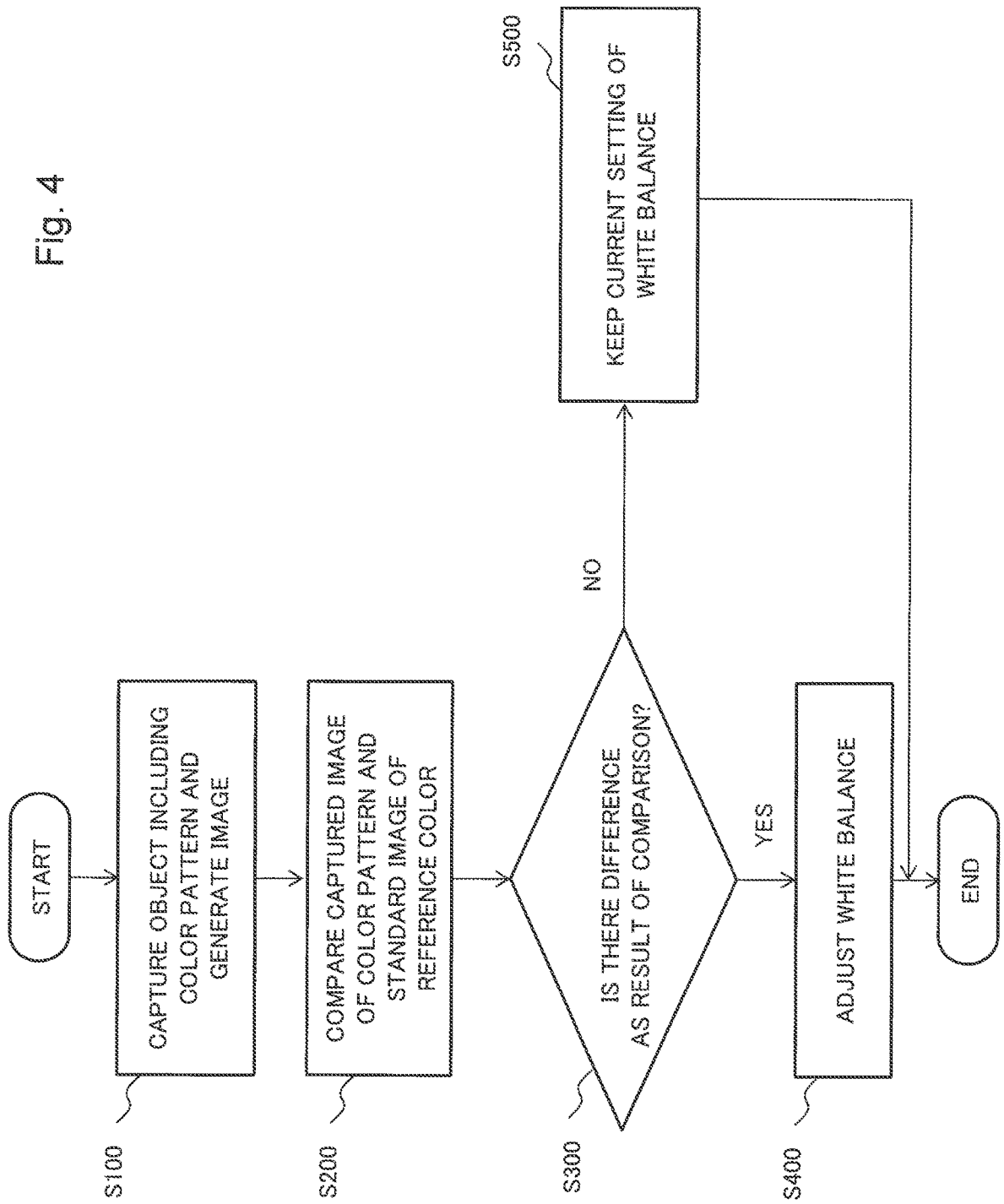
FIG. 4 is a flowchart illustrating an example of the processing of an information processing device according to the first exemplary embodiment.

FIG. 4 is a flowchart illustrating the processing of the information processing unit 120. The image capture unit 130 captures an object including a plurality of respectively different reference colors and generates an image (S100). Herein, the image capture unit 130 captures the color pattern 150 as an object including a plurality of respectively different reference colors. Then, the control unit 126 processes the captured image and extracts a feature value of color information for each pixel.

Next, the comparison unit 122 of the information processing unit 120 compares a portion of the image captured by the image capture unit 130 and relating to each of the reference colors with a standard image which is stored in the storage unit 128 and is a standard of the reference colors. (S200). Specifically, the comparison unit 122 compares the abovementioned feature values for each of red, green, and blue.

Next, when there is a difference between the feature value of the reference color of the captured image and the standard image feature value of the reference color stored in the storage unit 128 as a result of the comparison (YES at S300), the adjustment unit 124 adjusts white balance (S400). Specifically, the adjustment unit 124 adjusts white balance so that the feature value of the reference color of the captured image becomes the same as the standard image feature value of the reference color stored in the storage unit 128. When there is no difference (NO at S300), the adjustment unit 124 keeps the current setting of white balance (S500).

The first exemplary embodiment of the present invention enables to provide a POS terminal or the like which enables adjustment of white balance of an object to be sufficiently accurate even in the change of external light illuminating the object. The reason is that the first exemplary embodiment of the present invention adjusts white balance using a plurality of respectively different reference colors. Specifically, the reason is that the comparison unit 122 compares a portion of an image captured by the image capture unit 130 and relating to each of reference colors with an image which is a standard of the reference colors, and the adjustment unit 124 adjusts white balance based on a result of the comparison.

In the above, a description is given of the case where the POS terminal 100 includes the image capture unit 130, the comparison unit 122, and the adjustment unit 124 (see FIG. 3). The present exemplary embodiment is not limited to this case. For example, the POS terminal 100 on a client side may include the image capture unit 130, a device on a server side (not illustrated) may include the comparison unit 122 and the adjustment unit 124, and the POS terminal 100 may be connected to the server-side device by a wired or wireless communication. The server-side device acquires an image captured and generated by the image capture unit 130 of the POS terminal 100 via the wired or wireless communication, and performs comparison and white balance adjustment of the image.

Second Exemplary Embodiment

Next, a second exemplary embodiment is described. The second exemplary embodiment is different from the first exemplary embodiment in that a product 160 is used instead of the color pattern 150. It should be noted that the same reference numerals are assigned to the components which are substantially the same as those in the first exemplary embodiment, and the description therefor is omitted.

Figure 5:
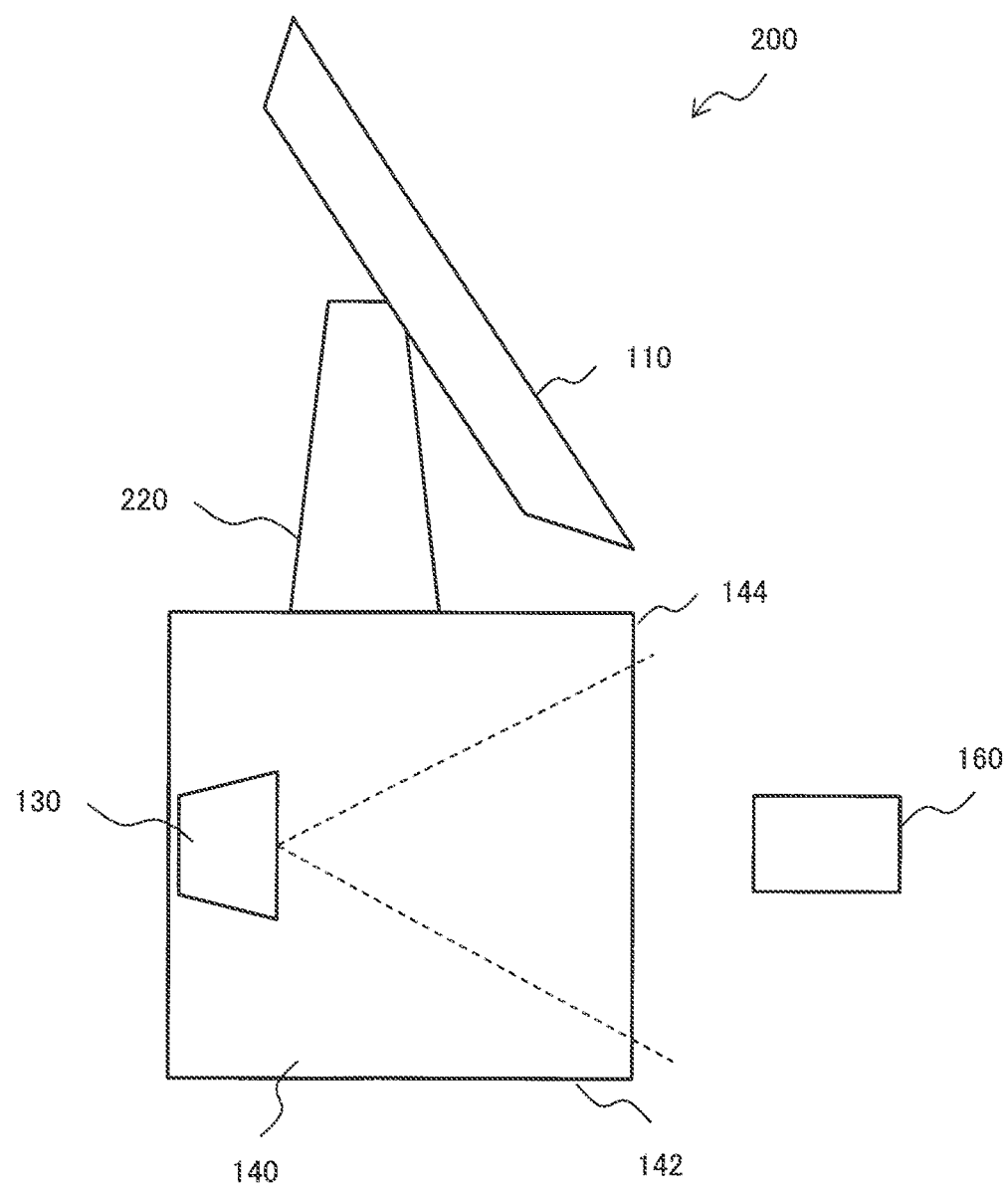
FIG. 5 is a side view illustrating an example of the appearance of a POS terminal according to a second exemplary embodiment of the present invention.

FIG. 5 is a side view illustrating the appearance of a POS terminal 200 according to the second exemplary embodiment. In comparison with the first exemplary embodiment (see FIG. 2), the POS terminal 200 does not include the color pattern 150. An image capture unit 130 captures the product 160 instead of capturing the color pattern 150.

For example, the product 160 includes a plurality of respectively different reference colors on the package thereof, and these reference colors are used instead of the reference colors indicated on the color pattern 150. For the product 160 without package, portions of colors appearing on the exterior of the product 160 and being the reference colors may be used. The product 160 includes at least two kinds of colors of red, green, and blue, which are the reference colors. Hereinafter, the case where the product 160 includes the reference colors on its package is described.

Figure 6:
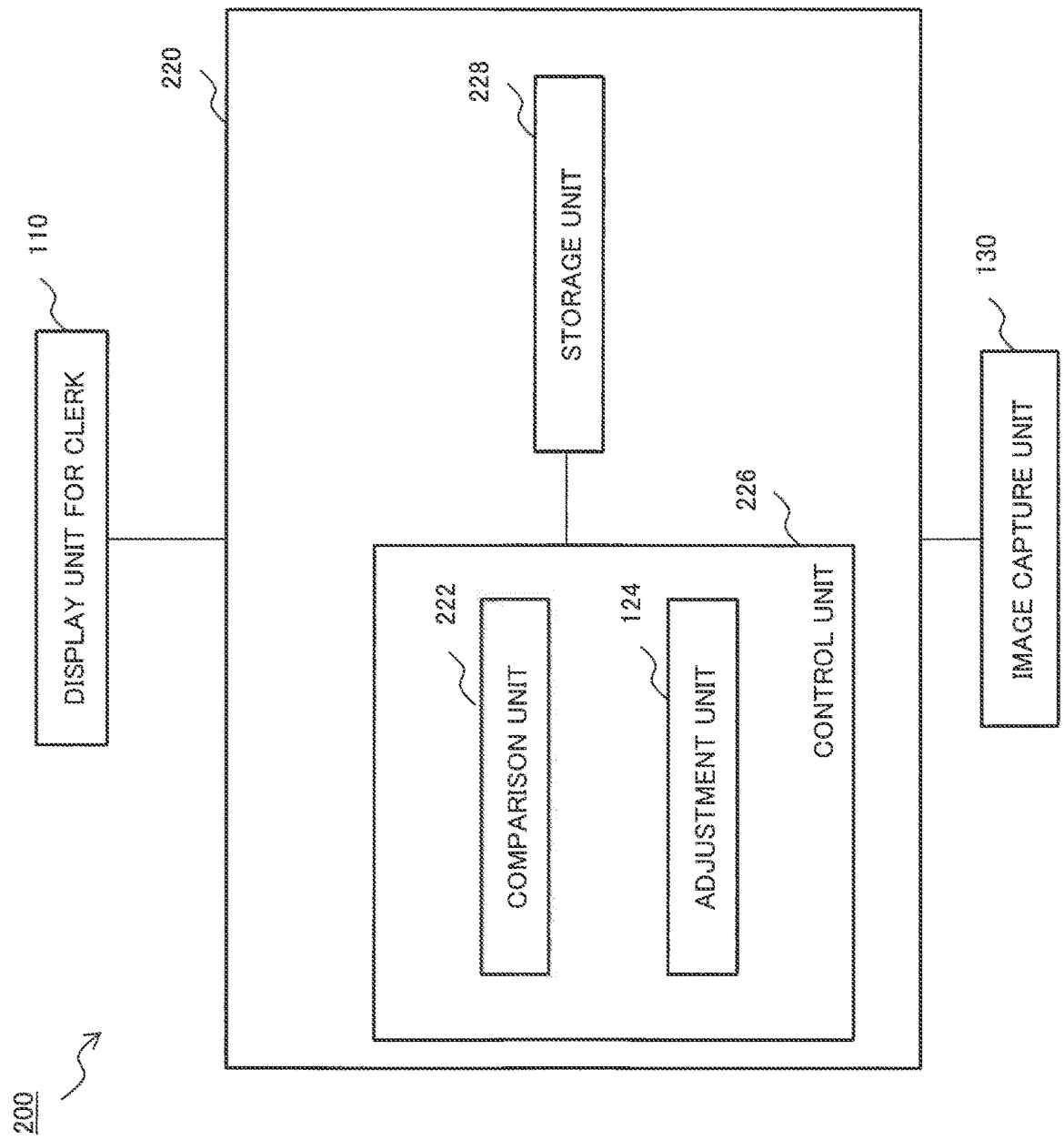
FIG. 6 is a view illustrating an example of the hardware configuration of the POS terminal according to the second exemplary embodiment.

FIG. 6 is a view illustrating the hardware configuration of the POS terminal 200 according to the second exemplary embodiment. The POS terminal 200 includes a display unit for a clerk 110, an information processing unit 220, and the image capture unit 130. The information processing unit 220 includes a control unit 226 and a storage unit 228. The control unit 226 includes a comparison unit 222 and an adjustment unit 124.

The storage unit 228 stores a database of an image of each product 160 in addition to a standard image feature value for the reference colors. The database of the product image herein refers to information on the shape and color being the feature of the product image for each product 160.

Figure 7:
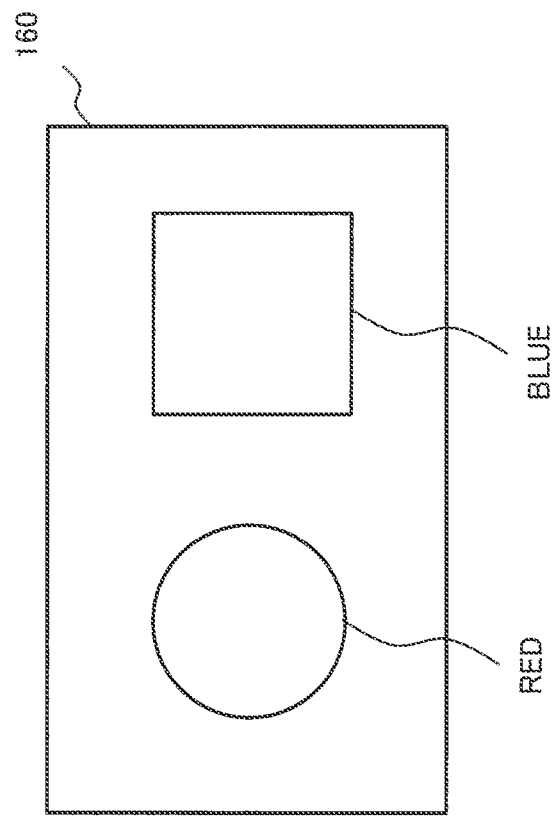
FIG. 7 is a view illustrating an example of the appearance of a product according to the second exemplary embodiment.

The control unit 226 collates the feature of an image captured by the image capture unit 130 with the feature of a product image in the product image database, and thereby specifies which product 160 the captured image is. The storage unit 228 stores information indicating which portion of the package of the specified product 160 (e.g., which position and size with respect to the external shape of the product 160) is which reference color. For example, the storage unit 228 stores information indicating that, as illustrated in FIG. 7, the package wrapping the product 160 includes a red circle at the substantially center position in the half-left region and a blue square at the substantially center position in the half-right region.

Figure 8:
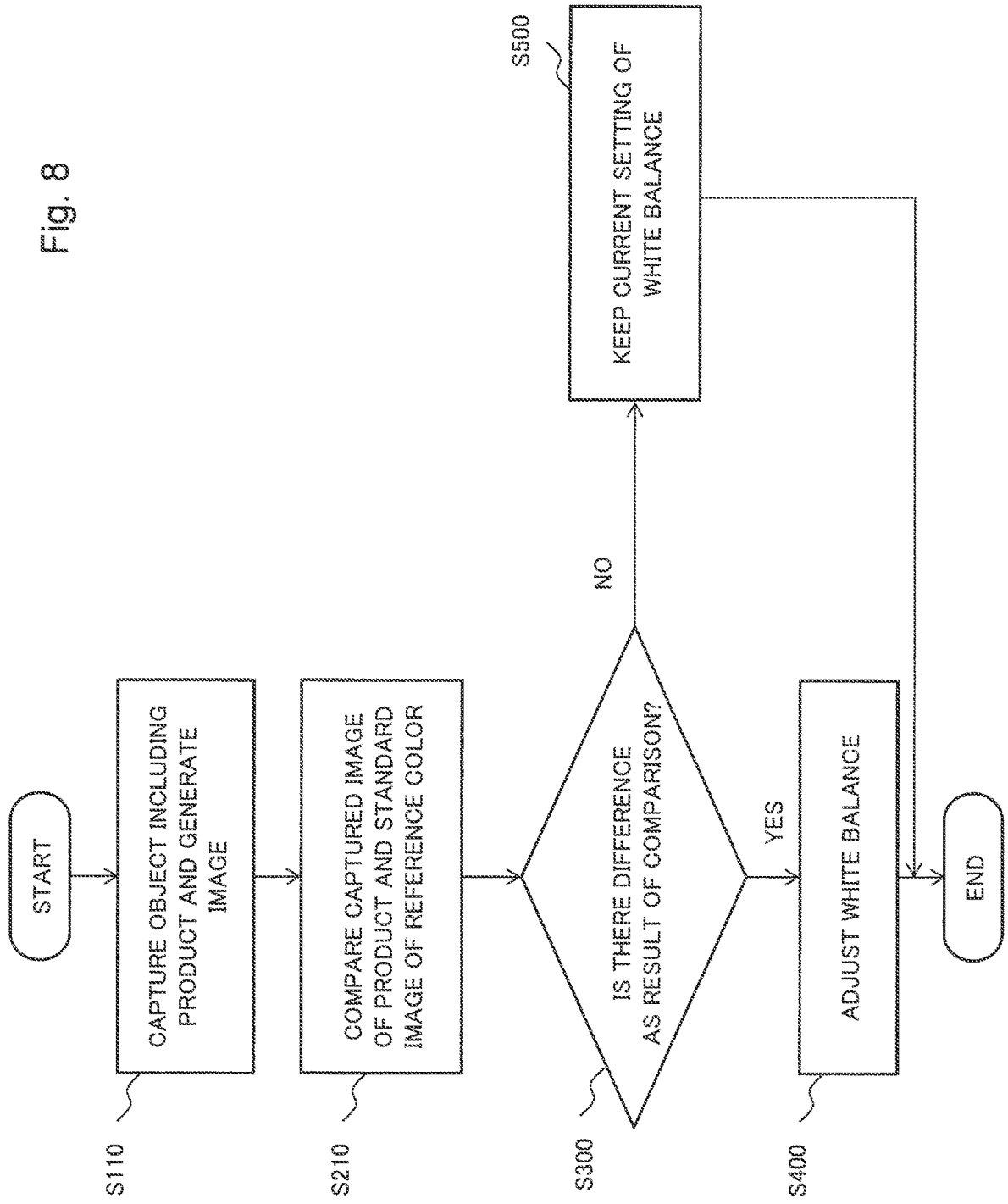
FIG. 8 is a flowchart illustrating an example of the processing of an information processing device according to the second exemplary embodiment.

FIG. 8 is a flowchart illustrating the processing of the information processing unit 220. The image capture unit 130 captures an object including the product 160 and generates an image (S110). Herein, the image capture unit 130 captures an image of the product 160 as an object including a plurality of respectively different reference colors.

The control unit 226 processes the captured image and extracts a feature value of color information for each pixel. The control unit 226 uses the above-mentioned information stored in the storage unit 228 and specifies which product the captured product 160 is by matching the product 160 with a product image database in the storage unit 228. Then, the control unit 226 recognizes which portion of the package of the specified product is which reference color.

Next, the comparison unit 222 of the information processing unit 220 compares a feature value of a portion of the image captured by the image capture unit 130, the portion being the reference color on the package of the product 160, with a standard image feature value of the reference color stored in the storage unit 228. (S210). Specifically, the comparison unit 222 performs comparison processing as described above for red and blue in the case of the package of the product 160 illustrated in FIG. 7.

Next, when there is a difference between the feature value of the reference color portion of the captured image and the feature value of the reference color stored in the storage unit 228 as a result of the comparison (YES at S300), the adjustment unit 124 adjusts white balance (S400). When there is no difference (NO at S300), the adjustment unit 124 keeps the current setting of white balance (S500).

The second exemplary embodiment of the present invention adjusts white balance using a plurality of respectively different colors, and thus, enables to improve the accuracy of adjustment of white balance. The reason is that the comparison unit 222 compares a portion of an image captured by the image capture unit 130 and relating to each of reference colors with an image which is a standard of the reference colors, and the adjustment unit 124 adjusts white balance based on a result of the comparison. In other words, the present exemplary embodiment adjusts white balance using a plurality of respectively different colors. This enables to improve the accuracy of adjustment of white balance.

Further, the present exemplary embodiment adjusts white balance using the product 160. In other words, the present exemplary embodiment enables to eliminate the need of the color pattern 150, thereby enabling to reduce the number of components.

In the above, a description has been given of the case where the POS terminal 200 includes the image capture unit 130, the comparison unit 222, and the adjustment unit 124. The present exemplary embodiment is not limited to only this case. For example, the POS terminal 200 may include the image capture unit 130, an information processing device such as a server may include the comparison unit 222 and the adjustment unit 124, and the POS terminal 200 may be connected to the information processing device by a wired or wireless communication. The information processing device acquires an image captured and generated by the image capture unit 130 of the POS terminal 200 via the wired or wireless communication, and performs white balance adjustment of the image.

Modification Example of Second Exemplary Embodiment

Next, a modification example of the second exemplary embodiment is described. The modification example of the second exemplary embodiment may use a card indicating reference colors instead of the product 160. The card may be an employee ID card or the like. A method of adjusting white balance is the same as in the second exemplary embodiment, and thus, the description therefor is omitted.

The modification example of the second exemplary embodiment of the present invention adjusts white balance using a plurality of respectively different colors, and thus, enables to improve the accuracy of adjustment of white balance.

Further, the present modification example adjusts white balance using the product 160 and eliminates the need for the POS terminal 200 to include the color pattern 150, thereby enabling to reduce the number of components.

(Information Processing Device)

The processing of the POS terminals 1, 100, and 200 according to the present invention may be applied to a program to be executed by a computer. In addition, the program can be stored in a storage medium or can be provided to outside via a network.

The information processing unit 120 according to the above-described exemplary embodiments can be also implemented using an information processing device (computer). In this case, at least the image capture unit 10 (130), the comparison unit 20 (122, or 222), and the adjustment unit 30 (124) out of the units in each of the POS terminals 1, 100, and 200 illustrated in FIGS. 1, 3, and 6 can be regarded as functional (processing) units (software modules) of a software program. An example of a hardware environment which can implement these functions (processing) is described with reference to FIG. 9. Nonetheless, sections of the units illustrated in the drawing are a structure for illustrative purpose, and various structures may be assumed for implementation.

Figure 9:
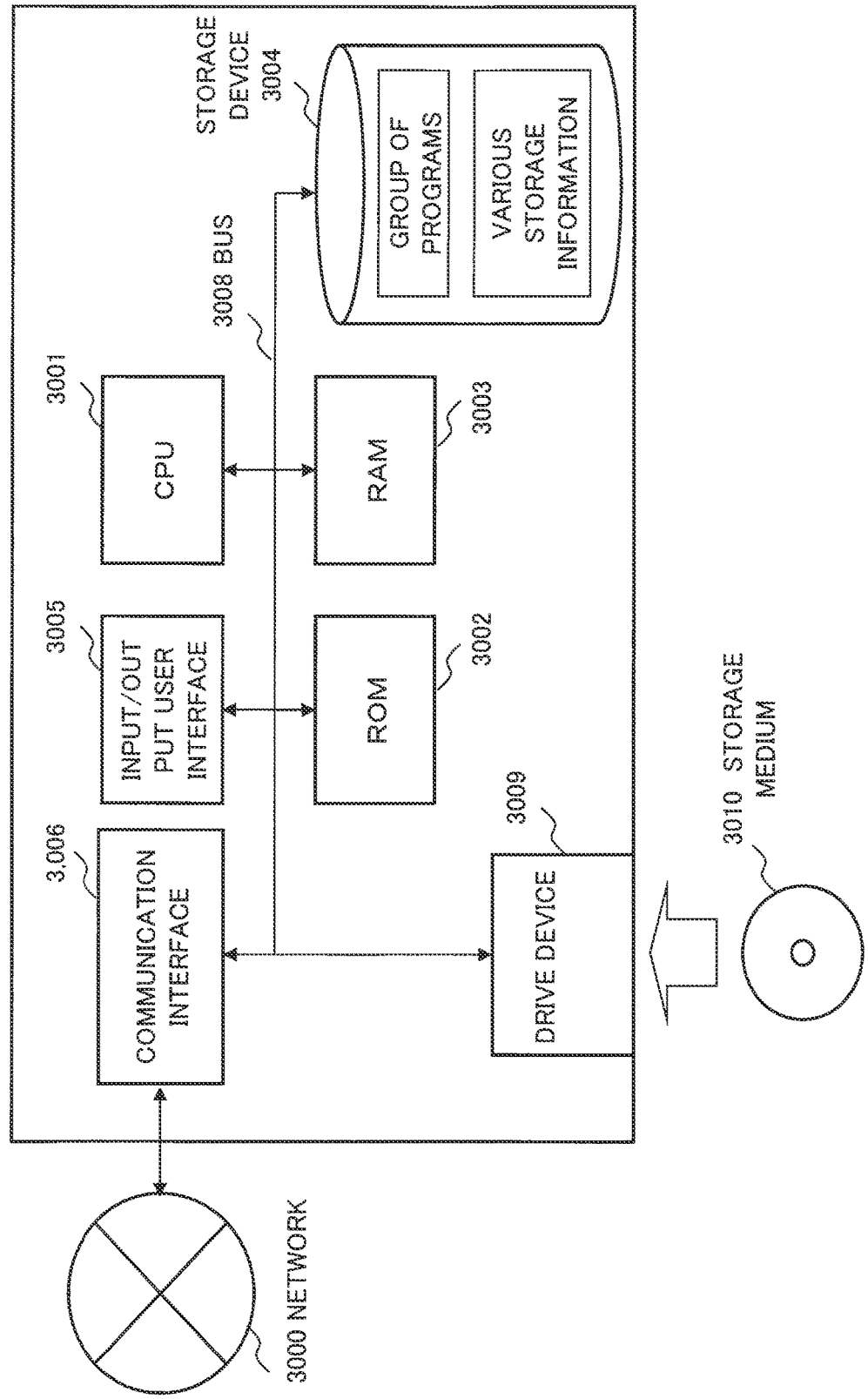
FIG. 9 is a view illustrating an example of the hardware configuration of the information processing device according to each of the exemplary embodiments.

FIG. 9 is a view illustrating an example configuration of an information processing device 1000 capable of implementing the POS terminals 1, 100, and 200 and the information processing unit 120 according to the exemplary embodiments of the present invention.

The information processing device 1000 illustrated in FIG. 9 is a general computer which includes the following components connected via a bus (communication path) 3008, which are:

a CPU 3001,
a read-only memory (ROM) 3002;
a random-access memory (RAM) 3003;
a storage device 3004;
an input/output user interface (hereinafter, referred to as "I/F") 3005;
an I/F 3006 for communication with an external device; and
a drive device 3009.

The input/output user I/F 3005 is equivalent to the display unit for a clerk 110 illustrated in FIGS. 2 and 5. The drive device 3009 reads out software (program) for executing the information processing device 1000 from an external network 3000 via a recording medium 3010 or the communication I/F 3006.

Then, in the above-described hardware environment, the above-described exemplary embodiments are accomplished by the following procedure. In other words, a computer program capable of implementing, on the information processing device 1000 illustrated in FIG. 9, the function of the block configuration view (FIG. 1, 3, or 6) or the flowchart (FIGS. 4 and 8) referred to in the description of the exemplary embodiments is supplied from the network 3000 or the drive device 3009.

Subsequently, the computer program is read and interpreted by the CPU 3001 of the hardware, and executed by the CPU 3001. In addition, the computer program supplied within the information processing device 1000 may be stored in a readable/writable volatile storage device (RAM 3003) or a non-volatile storage device such as the storage device 3004.

The present invention has been described using each of the exemplary embodiments described above as an exemplary example. However, the present invention is not limited to the above-described exemplary embodiments. In other words, various modes that a person skilled in the art can understand can be applied to the present invention within the scope of the present invention.

This application is based upon and claims the benefit of priority from Japanese Patent Application No. 2014-065933, filed on Mar. 27, 2014, the disclosure of which is incorporated herein in its entirety by reference.

REFERENCE SIGNS LIST

1, 100, 200 POS terminal
10 Image capture unit
20 Comparison unit
30 Adjustment unit
110 Display unit for a clerk
120, 220 Information processing unit
122, 222 Comparison unit
124 Adjustment unit
126, 226 Control unit
128, 228 Storage unit
130 Image capture unit
140 Product reading device
144 Product reading face
150 Color pattern
160 Product
1000 Information processing device
3000 Network
3001 CPU
3003 RAM
3004 Storage device
3005 Input/output user I/F
3006 Communication I/F
3009 Drive device
3010 Recording medium

The invention claimed is:

1. A Point of Sales (POS) terminal comprising:
a memory storing instructions; and
at least one processor configured to execute the instructions to:
capture a product and generate an image;
specify and recognize the product from the image;

compare a plurality of portions of the image, including one or more colors of the product, with a standard image including one or more reference colors corresponding to the specified product; and
adjust white balance based on a result of the comparison.

2. The POS terminal according to claim 1, wherein the processor is further configured to execute the instructions to:
compare a feature value of at least one of the plurality of portions of the image including the one or more colors with a feature value of the standard image including the one or more reference colors.

3. The POS terminal according to claim 2, wherein the standard image is an image acquired by capturing the one or more reference colors under a predetermined condition.

4. The POS terminal according to claim 2, wherein the one or more reference colors are:
colors indicated on a color pattern,
colors of another product, or
colors of a card provided in an image capture range.

5. The POS terminal according to claim 1, wherein the standard image is an image acquired by capturing the one or more reference colors under a predetermined condition.

6. The POS terminal according to claim 5, wherein the one or more reference colors are:
colors indicated on a color pattern,
colors of another product, or
colors of a card provided in an image capture range.

7. The POS terminal according to claim 1, wherein the one or more reference colors are:
colors indicated on a color pattern,
colors of another product, or
colors of a card provided in an image capture range.

8. The POS terminal according to claim 1, wherein the product includes a plurality of different colors including the one or more colors, and the processor is further configured to execute the instructions to:
compare at least one of the plurality of difference colors.

9. The POS terminal according to claim 1, wherein the processor is further configured to execute the instructions to:
compare the standard image with the image, which includes the plurality of portions including the one or more colors of the product based on feature information of the product image stored in a storage.

10. The POS terminal according to claim 1, wherein the processor is further configured to execute the instructions to:
specify the plurality of portions of the image including the one or more colors based on information that is stored in a storage and represents an arrangement of the one or more colors displayed on the product.

11. The POS terminal according to claim 1, wherein the processor is further configured to execute the instructions to:
specify one or more parts of the product, wherein each of the one or more parts has a corresponding one of the one or more reference colors.

12. An information processing device comprising:
a memory storing instructions; and
at least one processor configured to execute the instructions to:
acquire an image generated by capturing a product, the product including a plurality of different colors;
specify and recognize the product from the image;
compare a plurality of portions of the image, including one or more of the plurality of different colors, with a standard image including one or more reference colors corresponding to the specified product; and
adjust white balance based on a result of the comparison.

13. The information processing device according to claim 12, further comprising:
a POS terminal configured to capture the product including the plurality of different colors and generate the image.

14. A white balance adjustment method comprising:
capturing a product including a plurality of different colors and generating an image;
specifying and recognizing the product from the image;
comparing a plurality of portions of the image, including one or more of the plurality of different colors, with a standard image including one or more reference colors corresponding to the specified product; and
adjusting white balance based on a result of the comparison.

15. A non-transitory computer readable storage medium including a processor which causes a computer to execute a method, the method comprising:
capturing a product including a plurality of different colors and generating an image;
specifying and recognizing the product from the image;
comparing a plurality of portions of the image, including one or more of the plurality of different colors, with a standard image including one or more reference colors corresponding to the specified product; and
adjusting white balance based on a result of the comparison.

* * * * *